United States Patent
Schäfer et al.

(10) Patent No.: US 8,549,975 B2
(45) Date of Patent: Oct. 8, 2013

(54) PYROTECHNIC ACTUATOR WITH A CYLINDER HAVING COMMUNICATING CHAMBERS

(75) Inventors: Joachim Schäfer, Darmstadt (DE); Volker Scheuch, Sailauf (DE); Werner Schmidt, Alzenau (DE); Martin Zilg, Aschaffenburg/Nilkheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1137 days.

(21) Appl. No.: 12/091,893

(22) PCT Filed: Oct. 2, 2006

(86) PCT No.: PCT/EP2006/009540
§ 371 (c)(1),
(2), (4) Date: Sep. 26, 2008

(87) PCT Pub. No.: WO2007/048484
PCT Pub. Date: May 3, 2007

(65) Prior Publication Data
US 2009/0217809 A1    Sep. 3, 2009

(30) Foreign Application Priority Data
Oct. 28, 2005  (DE) .......................... 10 2005 051 657

(51) Int. Cl.
*B64D 1/04*  (2006.01)
*F41F 5/00*  (2006.01)

(52) U.S. Cl.
USPC ............... 89/1.14; 89/1.1; 102/293; 102/530; 102/531; 280/806; 188/371; 180/69.23; 180/274

(58) Field of Classification Search
USPC ................. 89/1.14, 1.1; 102/293, 530, 531; 280/806; 188/371; 180/69.23, 274
See application file for complete search history.

(56) References Cited

U.S. PATENT DOCUMENTS

| | | | |
|---|---|---|---|
| 2,892,452 A | 5/1957 | Weinstock | |
| 3,118,349 A | 1/1964 | Combs | |
| 3,861,307 A * | 1/1975 | Litz, Jr. | 102/338 |
| 3,891,271 A * | 6/1975 | Fieni | 297/470 |

(Continued)

FOREIGN PATENT DOCUMENTS

| | | |
|---|---|---|
| DE | 19961019 C1 | 2/2001 |
| DE | 10116717 A1 | 10/2002 |

(Continued)

OTHER PUBLICATIONS

European Patent Office, European Office Action for Application 06805985.6, dated Nov. 2, 2011.

(Continued)

*Primary Examiner* — Michelle Clement
(74) *Attorney, Agent, or Firm* — Ingrassia Fisher & Lorenz, P.C.

(57) ABSTRACT

A pyrotechnic actuator for an active bonnet is provided that includes, but is not limited to a cylinder, a piston which can be displaced in the cylinder under the influence of a propellant gas and a first gas generator for producing the propellant gas. The actuator includes, but is not limited to at least one further gas generator, which can be ignited independently of the first gas generator.

16 Claims, 4 Drawing Sheets

(56) References Cited

U.S. PATENT DOCUMENTS

| | | | |
|---|---|---|---|
| 3,957,281 A * | 5/1976 | Pech | 297/470 |
| 3,999,780 A * | 12/1976 | Matsuoka et al. | 297/470 |
| 4,341,147 A * | 7/1982 | Mayer | 89/7 |
| 4,451,717 A * | 5/1984 | Crookston et al. | 200/82 B |
| 4,716,808 A * | 1/1988 | Hoch et al. | 89/1.812 |
| 4,753,151 A | 6/1988 | Peterson | |
| 5,303,631 A | 4/1994 | Frehaut et al. | |
| 5,310,219 A * | 5/1994 | Fohl | 280/806 |
| 5,407,148 A | 4/1995 | Ono et al. | |
| 5,495,790 A * | 3/1996 | Greiner | 92/85 R |
| 5,803,494 A * | 9/1998 | Headley | 280/741 |
| 5,873,599 A | 2/1999 | Bauer et al. | |
| 6,065,704 A | 5/2000 | Pywell et al. | |
| 6,076,856 A * | 6/2000 | Wang et al. | 280/806 |
| 6,079,745 A * | 6/2000 | Wier | 280/806 |
| 6,089,605 A * | 7/2000 | Muller | 280/806 |
| 6,234,522 B1 * | 5/2001 | Albrecht et al. | 280/737 |
| 6,289,820 B1 * | 9/2001 | Anacker et al. | 102/530 |
| 6,345,739 B1 * | 2/2002 | Mekata | 222/389 |
| 6,414,905 B1 * | 7/2002 | Owens et al. | 367/83 |
| 6,530,305 B1 * | 3/2003 | MacLeod et al. | 89/1.81 |
| 6,568,184 B2 * | 5/2003 | Blackburn et al. | 60/636 |
| 6,572,147 B2 * | 6/2003 | Webber et al. | 280/806 |
| 6,575,498 B2 | 6/2003 | Nagata et al. | |
| 6,672,194 B2 | 1/2004 | Daoud | |
| 6,763,764 B2 | 7/2004 | Avetisian et al. | |
| 6,764,118 B2 | 7/2004 | DePottey et al. | |
| 6,814,372 B1 * | 11/2004 | Kang et al. | 280/740 |
| 6,834,885 B2 * | 12/2004 | Mizuno et al. | 280/737 |
| 6,942,056 B2 | 9/2005 | Nadeau et al. | |
| 6,942,261 B2 | 9/2005 | Larsen et al. | |
| 6,959,548 B2 | 11/2005 | Borg et al. | |
| 7,059,458 B2 * | 6/2006 | Borg et al. | 188/371 |
| 7,134,445 B2 * | 11/2006 | Broyer et al. | 137/68.13 |
| 7,182,191 B2 | 2/2007 | Scott et al. | |
| 7,296,504 B2 * | 11/2007 | Borg et al. | 89/1.14 |
| 7,303,040 B2 | 12/2007 | Green et al. | |
| 7,325,622 B2 * | 2/2008 | Sjostrom | 169/73 |
| 7,475,752 B2 | 1/2009 | Borg et al. | |
| 7,698,895 B2 | 4/2010 | Bretfeld et al. | |
| 8,047,569 B2 * | 11/2011 | Cox et al. | 280/736 |
| 8,311,701 B2 | 11/2012 | Iwai et al. | |
| 2002/0014076 A1 * | 2/2002 | Blackburn et al. | 60/508 |
| 2002/0093182 A1 * | 7/2002 | Mizuno et al. | 280/736 |
| 2003/0033926 A1 * | 2/2003 | MacLeod et al. | 89/1.81 |
| 2004/0134705 A1 | 7/2004 | Nadeau et al. | |
| 2004/0222620 A1 * | 11/2004 | Wang et al. | 280/737 |
| 2004/0256850 A1 * | 12/2004 | Yamaguchi | 280/806 |
| 2005/0000766 A1 | 1/2005 | Borg et al. | |
| 2005/0006191 A1 * | 1/2005 | Borg et al. | 188/371 |
| 2005/0016371 A1 * | 1/2005 | Borg et al. | 89/1.14 |
| 2005/0173132 A1 * | 8/2005 | Sjostrom | 169/73 |
| 2005/0257829 A1 * | 11/2005 | Broyer et al. | 137/68.13 |
| 2007/0085309 A1 * | 4/2007 | Kelley et al. | 280/736 |
| 2008/0047269 A1 * | 2/2008 | Borg et al. | 60/637 |
| 2009/0217809 A1 * | 9/2009 | Schafer et al. | 89/1.14 |
| 2010/0013201 A1 * | 1/2010 | Cox et al. | 280/741 |
| 2010/0052302 A1 * | 3/2010 | Bok et al. | 280/806 |
| 2010/0089048 A1 * | 4/2010 | Schaefer | 60/407 |
| 2010/0276544 A1 * | 11/2010 | Hlavacek et al. | 244/137.1 |
| 2011/0011256 A1 * | 1/2011 | Borg et al. | 91/356 |
| 2011/0221173 A1 * | 9/2011 | Cox et al. | 280/736 |
| 2011/0290575 A1 * | 12/2011 | Kaiser et al. | 180/274 |

FOREIGN PATENT DOCUMENTS

| | | |
|---|---|---|
| DE | 20214904 U1 | 2/2003 |
| DE | 10305685 A1 | 9/2004 |
| DE | 10308140 B3 | 9/2004 |
| DE | 10343106 A1 | 10/2004 |
| DE | 102004004988 A1 | 8/2005 |
| EP | 0779448 A1 | 6/1997 |
| EP | 0940584 A2 | 9/1999 |
| FR | 1056323 A | 2/1954 |
| GB | 2175375 A | 11/1986 |
| WO | 2004048159 A1 | 6/2004 |

OTHER PUBLICATIONS

Response to European Office Action issued in EP Application No. 06805985.6, dated Feb. 10, 2012.

ISA, International Search Report for Application No. PCT/EP2006/009540, dated Dec. 20, 2006.

USPTO, Non-final Office Action issued in U.S. Appl. No. 13/454,400 mailed Dec. 28, 2012.

Response to Non-final Office Action for U.S. Appl. No. 13/454,400 dated Mar. 22, 2013.

* cited by examiner

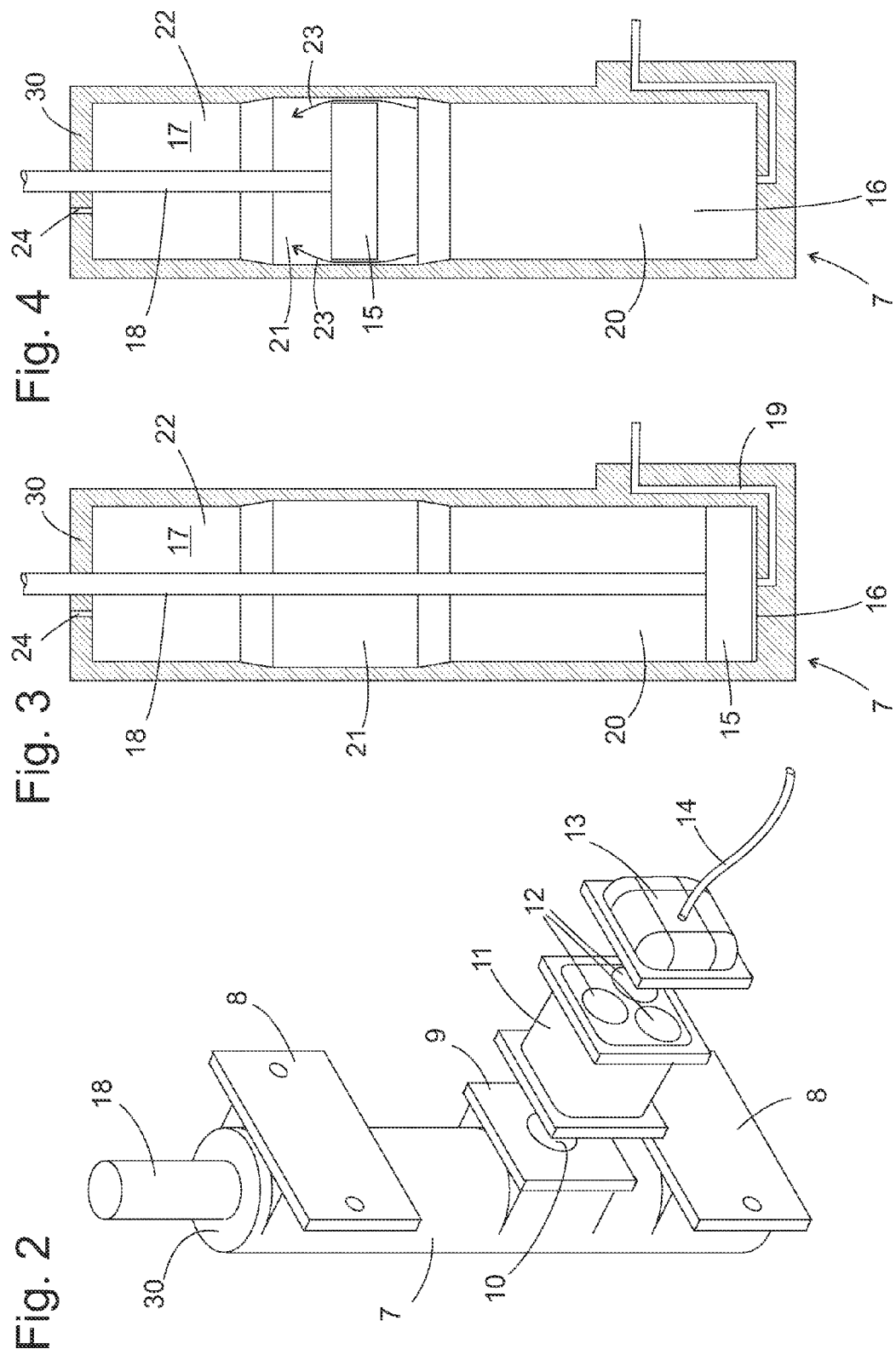

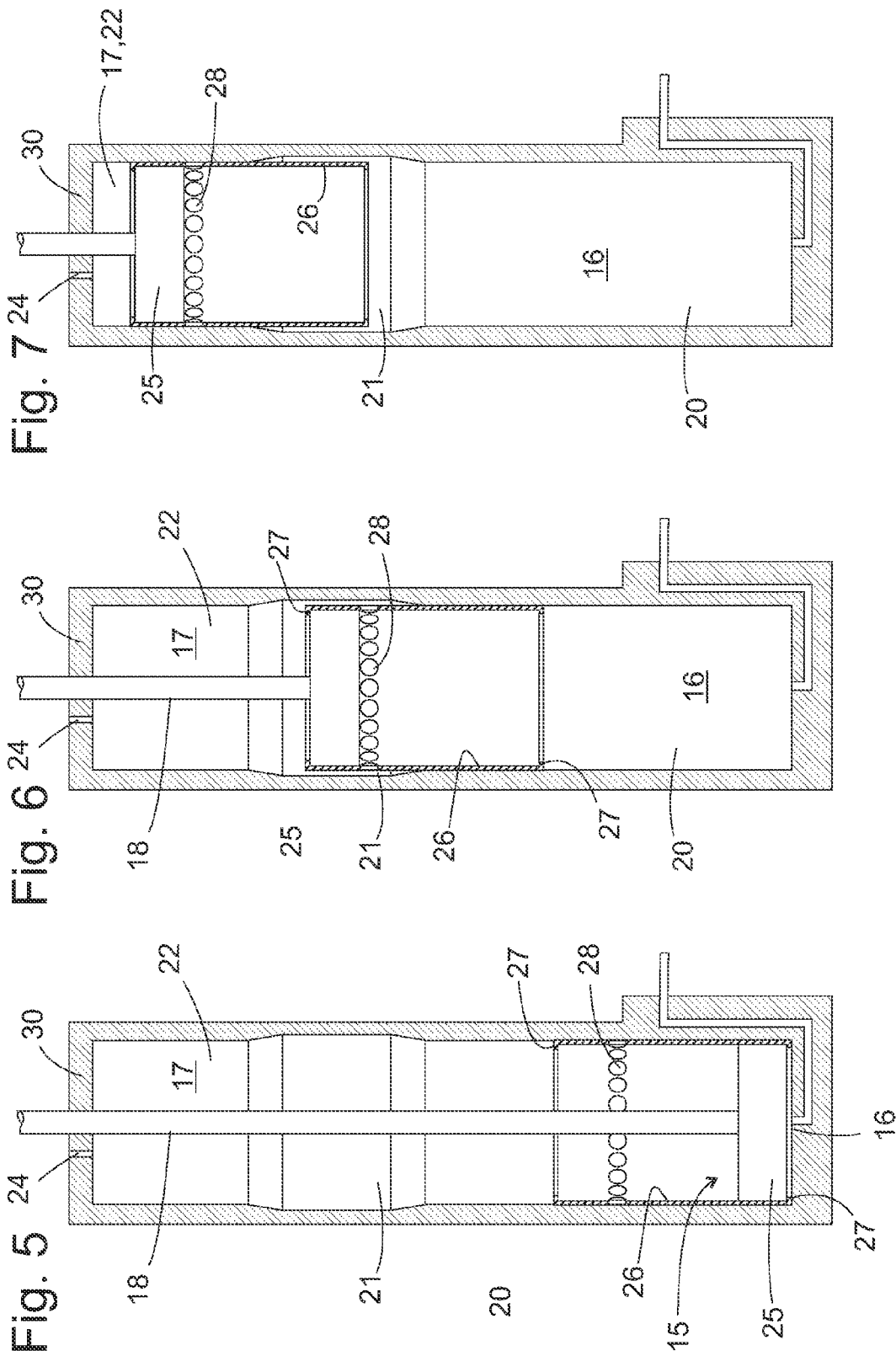

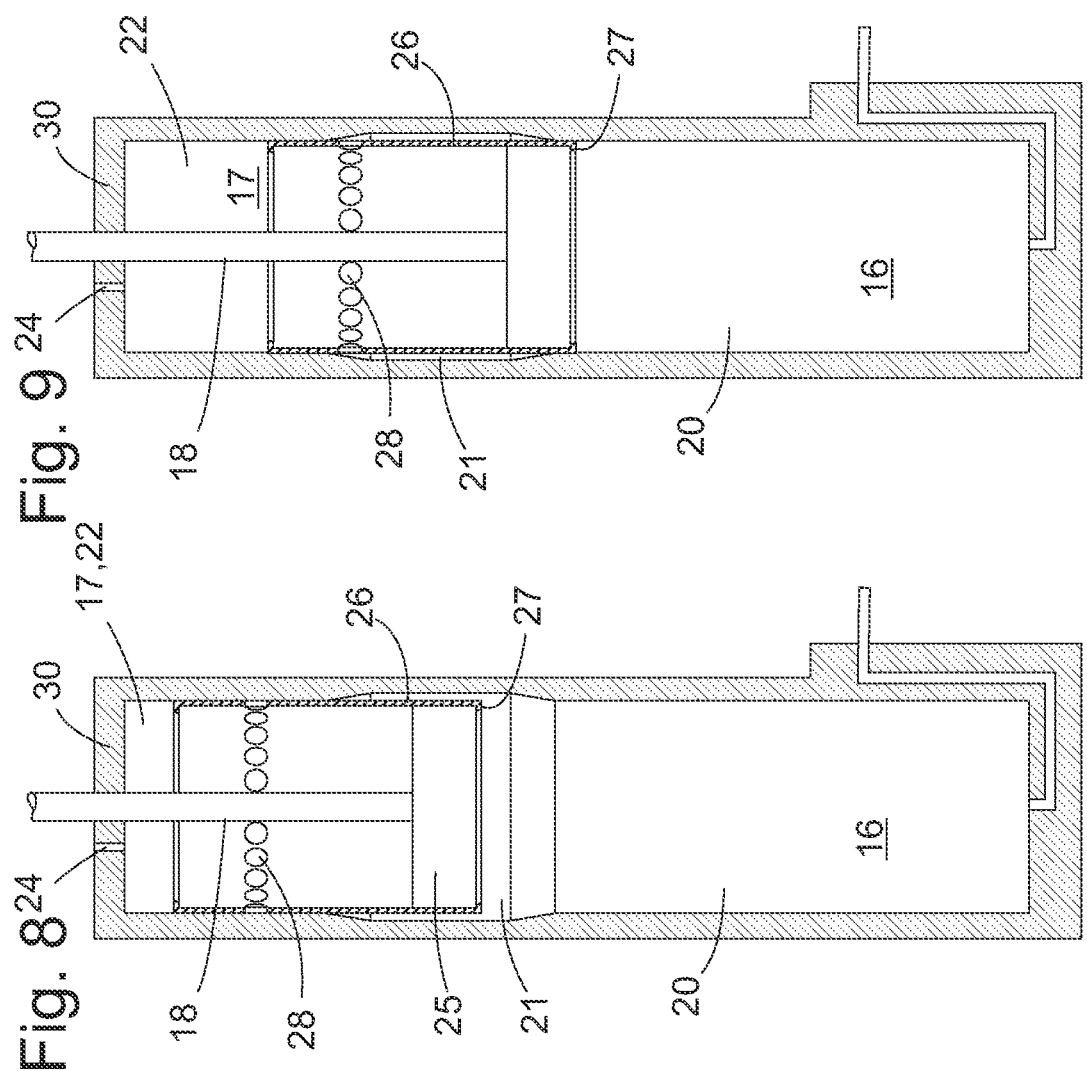

PYROTECHNIC ACTUATOR WITH A CYLINDER HAVING COMMUNICATING CHAMBERS

CROSS-REFERENCE TO RELATED APPLICATIONS

This application is a U.S. National-Stage entry under 35 U.S.C. §371 based on International Application No. PCT/EP2006/009540, filed Oct. 2, 2006, which was published under PCT Article 21(2) and which claims priority to German Application No. DE 10 2005 051 657.2, filed Oct. 28, 2005, which are herein incorporated in their entirety by reference.

TECHNICAL FIELD

The present invention relates to a pyrotechnic actuator for an active bonnet of a motor vehicle.

BACKGROUND

An active bonnet is taken to mean a bonnet which is automatically raised in the event of an accident by one or more actuators to increase the spacing between the bonnet and parts of the motor vehicle which are located therebelow and are difficult to deform, and to thus provide a pedestrian possibly impacting against the bonnet with an extended braking path. This is intended to avoid the pedestrian colliding against the non-deformable body parts at a speed which may lead to life-threatening injuries.

Various pyrotechnic actuators have already been proposed for this purpose which use gas generators, such as are also known from airbags, to drive the bonnet movement. These pyrotechnic actuators have an advantageously short response time as they are generally electrically ignited and therefore solid parts do not have to be accelerated in a time-consuming manner to activate them, and they achieve a powerful acceleration of the bonnet so it reaches its raised position in the shortest time. However, it is disadvantageous that the conventional pyrotechnic actuators are not reversible. In other words, they are only suitable for a single use and then have to be exchanged. A faulty triggering of the actuators therefore makes an expensive stay in a workshop necessary every time. As it is hardly possible to avoid triggering of the actuators in the event of an accident, if the bonnet is unaffected by the events of the accident, the cost of repair of a vehicle equipped with pyrotechnic actuators is generally higher after an accident than those of a vehicle without these actuators.

A reversible actuator for a motor vehicle is known from DE 103 08140 B3, which is driven mechanically by spring force. An actuator of this type makes it apparently simple, after it has been triggered, to bring the bonnet back into its normal position from which a renewed triggering can take place, but the spring has to have large dimensions because of the very short lifting times so reversal of the spring is possible only with the aid of a gearing down mechanism. A further problem emerges from the fact that the tensioned springs press with a high force against an obstacle which, on activation of the actuator has to be moved extremely rapidly. A high pressure of the spring against the obstacle makes a correspondingly high driving force to remove the obstacle necessary, the build up of which severely delays the actuating movement of the actuator.

A further problem of conventional active bonnets is that the known actuators are in a position to sharply accelerate the bonnet but, as soon as the actuators reach their stop, the bonnet is decelerated still more abruptly than it was previously accelerated, and made to strongly vibrate. If a pedestrian impacts against a region of the bonnet between two actuators while said region is deflected downward, the spacing between this region of the bonnet and hard parts of the vehicle located below is sharply reduced, and there is a risk that the distance available for the deceleration of the pedestrian is not sufficient to avoid a collision against these hard vehicle parts.

In view of the foregoing, at least one object of the present invention is to provide an actuator for an active bonnet which is suitable for driving a plurality of lifting movements of the bonnet without making a stay in a workshop necessary after each of these lifting movements, and which thus avoids the disadvantages of a mechanical drive. In addition, other objects, desirable features, and characteristics will become apparent from the subsequent summary, detailed description, and the appended claims, taken in conjunction with the accompanying drawings and this background.

SUMMARY

The at least one object, desirable features and characteristics, are achieved by a pyrotechnic actuator with a cylinder, a piston which can be displaced in the cylinder under the influence of a propellant gas and a plurality of gas generators which can be ignited independently of one another.

The actuator preferably also has an electronic ignition circuit, which, upon external ignition commands, ignites the gas generators in each case individually and sequentially.

A further object of the invention is to provide an actuator which is in a position once the bonnet has been lifted to prevent or at least limit undesired vibrations thereof.

This object is achieved in that, in a pyrotechnic actuator with a cylinder, a piston which can be displaced in the cylinder under the influence of a propellant gas and a first gas generator for producing the propellant gas, the cylinder has two chambers on either side of the piston, which can be charged with propellant gas from the gas generator. If, in a normal position of the actuator, the first of these chambers is significantly smaller than the second, a small quantity of gas fed into the first chamber is sufficient to build up a high pressure therein, which drives the movement of the piston. This movement inevitably continuously reduces the volume of the second chamber, so a counter-pressure building up in this second chamber gradually decelerates the movement of the piston and, with it, the movement of a bonnet driven by the actuator. A hard stopping of the piston at the end of this adjustment path that would excite strong vibrations of the bonnet is thus avoided.

In order to avoid an unnecessarily early build up of a counter-pressure in the second chamber, the second chamber can preferably be charged with the propellant gas after the first chamber. A sequence of this type can be structurally ensured in a simple manner in that the second chamber can be charged with the propellant gas through the first chamber. With an arrangement of this type, the second chamber only receives propellant gas to a significant extent when the latter has built up sufficient pressure in the first chamber, in order to penetrate from there into the second chamber.

In order to delay the supply of the second chamber with propellant gas, an inlet passage for propellant gas into the second chamber is preferably blocked in a rest position of the piston and is only open when the piston is deflected from the rest position.

In order to ensure an effective support of the bonnet in the raised state by the gas pressure prevailing in the first chamber of the actuator, the inlet passage should expediently also be blocked when the piston is in an end position opposite to the rest position.

A throttled transfer of propellant gas from the first chamber into the second can be implemented in a simple manner if the inside width of the cylinder in a central region of the cylinder is greater than in at least one of its end regions.

If a pedestrian impacts against the bonnet this will generally lead to the actuator piston moving back, during which movement work is carried out against the pressure of the propellant gas in the first chamber, so the pedestrian is decelerated. In order to keep the pressure of the propellant gas in the first chamber during this downward movement, the piston expediently comprises a central piece connected to a piston rod and an apron surrounding the central piece and axially displaceable thereon.

The axial displaceability of the apron against the central piece should be limited in both directions by stops to ensure that the apron follows a movement of the central piece.

To facilitate the gas transfer into the second chamber during the upward movement of the bonnet, the apron may be provided with local through openings.

The spacing of the through openings from one end of the apron is preferably larger than the length of the central region to ensure that a transfer of propellant gas from the first chamber into the second chamber substantially only takes place during an upward movement of the bonnet, but not during a downward movement.

A throttle point, by means of which the second chamber communicates with the surroundings, prevents a counter-pressure decelerating the piston movement from building up earlier than necessary in the second chamber.

The embodiments of the invention also relates to a motor vehicle with an active bonnet which is held on a frame of the motor vehicle by means of actuators of the type defined above. As the actuators themselves can yield in each case upon an impact, a bonnet held by them may be flexible over its entire surface, so a pedestrian is effectively protected regardless of on which location of the bonnet he impacts.

BRIEF DESCRIPTION OF THE DRAWINGS

The present invention will hereinafter be described in conjunction with the following drawing figures, wherein like numerals denote like elements.

FIG. 2 shows a perspective exploded view of an actuator according to the invention;

FIG. 3 shows a schematic section through an actuator cylinder according to the present invention in the normal position;

FIG. 4 shows the actuator cylinder from FIG. 3 with a raised piston;

FIG. 5 shows a schematic section through an actuator cylinder according to a second configuration of the invention in the normal position;

FIG. 6 shows an actuator cylinder during the raising of the bonnet;

FIG. 7 shows an actuator cylinder with a maximally raised bonnet;

FIG. 8 shows the actuator cylinder at a first instant during a downward movement of the bonnet driven by the impact of a pedestrian; and FIG. 9 shows a section through the actuator cylinder at a second, later instant of the downward movement.

DETAILED DESCRIPTION

Figure 1:
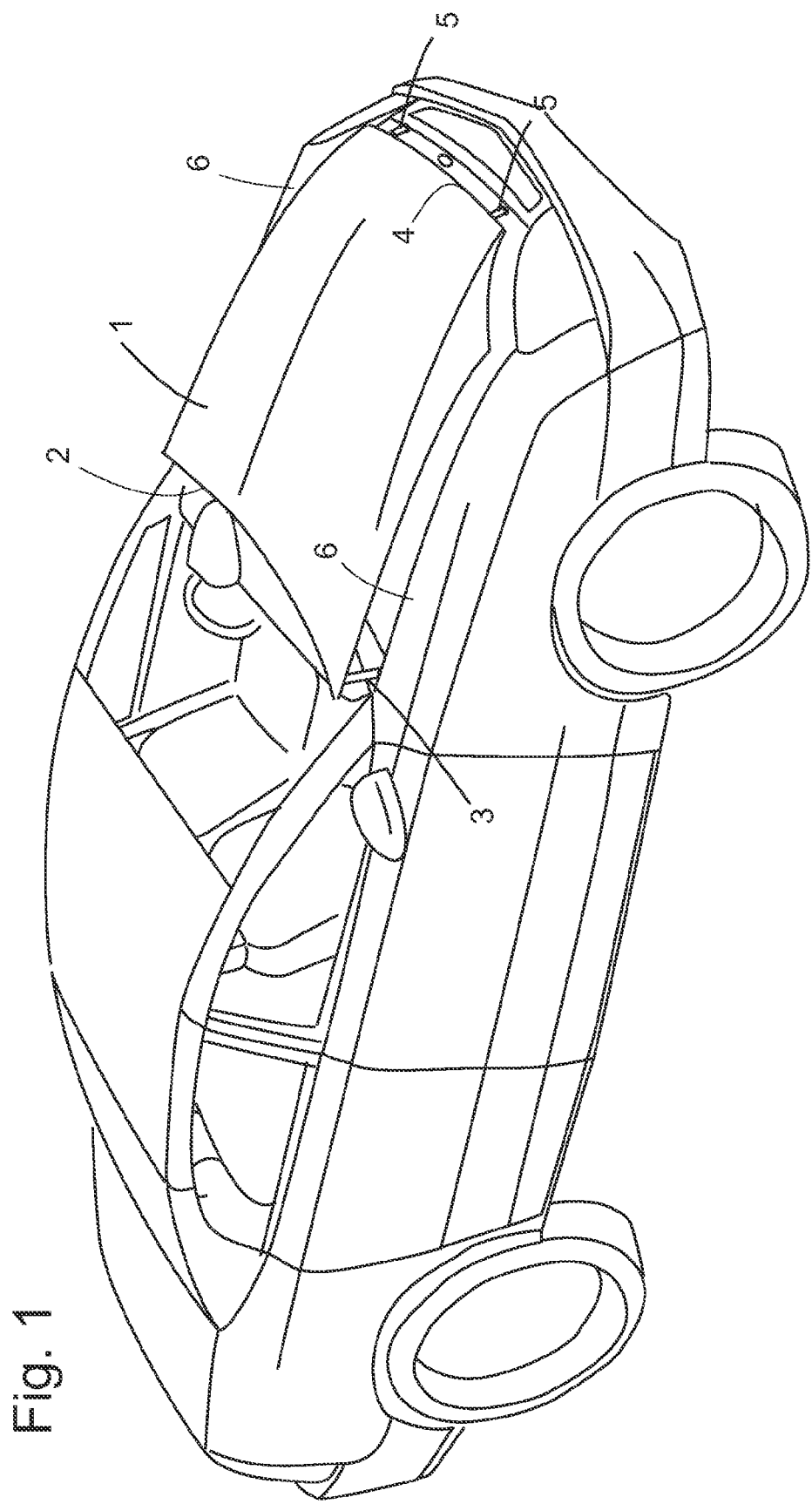
FIG. 1 shows a motor vehicle with a bonnet held by actuators in a raised position.

The following detailed description of the invention is merely exemplary in nature and is not intended to limit embodiments of the invention or the application and uses. Furthermore, there is no intention to be bound by any theory presented in the preceding background or the following detailed description.

FIG. 1 schematically shows a motor vehicle with an engine bonnet 1, which is held in a raised position compared to a normal position, in which it is flush with adjacent body parts 6, by actuators 5, 3 arranged adjacent to the front or rear edge of the bonnet 4, 2. The bonnet 1 is supported exclusively by the actuators 3, 5.

FIG. 2 shows a perspective exploded view of one of these actuators 3, 5. It comprises an elongated cylinder 7, which carries two fastening flanges 8 for the assembly of the cylinder 7 on a rigid frame of the motor vehicle. A gas inlet flange 9 with an inlet opening 10 is arranged between the fastening flanges 8. A gas generator carrier 11 is provided to be fastened in a gas tight manner on the inlet flange 9. The gas generator carrier 11 has chambers for three gas generators 12 which are connected to the inlet opening 10. A destructible partition, not shown in the Figure, may be attached in the gas generator carrier 11 in a passage between each chamber and inlet opening 10, in each case, which partition tears open when the gas generator 12 is ignited in the chamber associated with it, but protects a gas generator 12 accommodated in the chamber associated with it from also being ignited by the explosion of a gas generator 12 in an adjacent chamber.

A cover 13 to be assembled on the side of the gas generator carrier 11 remote from the cylinder 7 contains an electric ignition circuit which, on receipt of an ignition command by way of a signal cable 14, in each case ignites one of the gas generators 12.

The actuator of FIG. 2 is therefore in a position to drive three lifting movements of the bonnet 1, before it is used up and has to be exchanged.

It is obvious that more or less than three gas generators 12 may also be accommodated in the gas generator carrier 11. The number of gas generators will generally, however, not greater than five or six, as the number of the bonnet lifting movements to be expected during the service life of a motor vehicle is limited.

Basically, a gas generator carrier with a single gas generator would also be a possibility and would then have to be exchanged each time after a lifting of the bonnet 1 while the cylinder itself could remain in the vehicle. An exchange of the generator carrier which would then be necessary after each lifting of the bonnet 1, would, however, require considerable safety precautions which can only be ensured with difficulty in a motor vehicle workshop.

FIG. 3 shows a schematic section through the cylinder 7 of the actuator according to a first configuration of the invention in the normal state. A displaceable piston 15 divides the interior of the cylinder 7 into two chambers, a lower chamber 16, the volume of which is minimal in the normal position shown, and an upper chamber 17, which takes up almost the entire interior of the cylinder 7, and through which a piston rod 18 extends, to the upper end of which, not shown, the bonnet 1 is fastened. A gas line 19 extends from the inlet opening 10 into the lower chamber 16.

The wall of the cylinder 17 is subdivided in the longitudinal direction into three portions 20, 21, 22. The cross-section of the lower portion 20 and the upper portion 22 corresponds to that of the piston 15, so the latter, in these portions, substantially rests closely against the cylinder wall. In the central portion 21, the inside width of the cylinder is slightly larger than in the portions 20, 22, so when the piston 15 has been raised into the section 21 by propellant gas flowing into the gas chamber 16 by way of the gas line 19, part of the propellant gas can flow past the piston 15 into the upper chamber 17, as indicated by arrows 23. When the piston 15 reaches the upper portion 22 in the course of its further upward movement, it again closely adjoins the cylinder wall and the gas in the upper chamber 22 is compressed. The counter-pressure resulting therefrom decelerates the piston 15 and, with it, the bonnet 1, so the piston 15 does not, or at most only gently, strikes against the upper wall of the cylinder 7.

In this upper wall, a throttle passage 24 is shown, through which gas compressed in the chamber 17 can escape into the open. The free passage cross-section between the piston 15 and cylinder wall in the portion 21 and the passage cross-section of the throttle passage 24 are expediently adapted to one another such that the counter-pressure in the chamber 17 brings the upward movement of the piston to a standstill immediately before it impacts against the upper wall of the cylinder 7. The throttle passage 24, which is shown here as an opening spaced apart from the piston rod 18 in the upper wall of the cylinder, may, of course, also be formed by a gap between the piston rod 18 and the upper wall of the cylinder surrounding it.

In FIGS. 3 and 4, the central portion 21 is shown cylindrically, with a slightly enlarged diameter compared to the portions 20, 22. Obviously, the inside width in the portion 21 could also be enlarged only on a part of its periphery, for example by one or more grooves extending in the direction of the hollow axis of the cylinder 7 over the length of the portion 21, between which extend wall portions which are flush with the portions 20, 22 and also precisely guide the piston 15 in the central portion 21.

A further-developed configuration of the actuator is explained with the aid of FIGS. 5 to 9. The cylinder 7 has substantially the same configuration as that considered above. The piston 15 is subdivided into a flat cylindrical central piece 25 rigidly connected to the piston rod 18 and a sleeve 26 surrounding the central piece 25. The sleeve 26 has, at its upper and lower end, an inwardly directed peripheral web 27, in each case, which forms a stop for the central piece 25. A plurality of through openings 28 is formed at a distance from the upper edge of the sleeve 26, which is not greater than the thickness of the central piece 25. A lower portion 29 of the sleeve 26 which is free of openings is at least as long as the central portion 21 of the cylinder 7.

If the central piece 25 of the piston is driven out of the normal position shown in FIG. 5 by propellant gas flowing in by way of the gas line 19, it firstly rises inside the sleeve 26, which, due to inertia, remains at rest. Only when the central piece 25 strikes against the upper web 27 is the sleeve 26 entrained and the piston 15 reaches the position shown in FIG. 6, in which a passage of gas out of the lower chamber 16 into the upper chamber 17 takes place by way of the through openings 28.

In the course of the further upward movement of the piston, as shown in FIG. 7, the latter is gradually decelerated by gas pressure building up in the upper chamber 17. In the position in which the piston comes to rest, the openings have passed the portion 21, so no further gas can pass through them.

If a downward movement of the bonnet then starts under the pressure of an impacting passenger, initially only the central piece 25 moves; the sleeve 26 only follows as soon as the central piece 25 has reached the lower web 27 of the sleeve 26, as shown in FIG. 8. Although the central piece 25 is now in the portion 21 of the cylinder 7, since the through openings 28 have remained in the portion 22, propellant gas cannot pass to a significant extent from the lower chamber 16 into the upper chamber 17, so that to force the piston down work has to be carried out which is taken from the impact energy of the pedestrian.

FIG. 9 shows the stage of downward movement of the piston in which the through openings 28 reach the central portion 21 of the cylinder. At this instant, the central piece 25 and the lower edge of the sleeve 26 have already reached the portion 21, so no gas can overflow into the upper chamber 17 here either. Thus the pedestrian is effectively decelerated over the entire stroke of the piston 15 and optimally protected.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

LIST OF REFERENCE NUMERALS engine bonnet 1
edge 2
actuator 3
edge 4
actuator 5
body part 6
cylinder 7
fastening flange 8
gas inlet flange 9
inlet opening 10
gas generator carrier 11
gas generator 12
cover 13
signal cable 14
piston 15
lower chamber 16
upper chamber 17
piston rod 18
gas line 19
portion 20, 21, 22
arrow 23
throttle passage 24
central piece 25
sleeve 26
web 27
opening 28
portion 29
upper wall 30

The invention claimed is:
1. A pyrotechnic actuator, comprising:
a cylinder having a first chamber and a second chamber that are separated by a central region;
a piston that is configured to be displaced, under the influence of a propellant gas, through the central region between a first position in the first chamber and a second position in the second chamber, wherein the piston includes openings;

a first gas generator that is configured to be ignited to generate propellant gas; and wherein the first chamber is configured to be charged with the propellant gas to displace the piston, and wherein the second chamber is configured to be charged with the propellant gas that passes from the first chamber through the openings.

2. A pyrotechnic actuator, comprising:

a cylinder having a first chamber and a second chamber that are separated by a central region;

a piston on either side of the cylinder that is configured to be displaced between a first position in the first chamber and a second position in the second chamber, wherein the piston comprises a central piece connected to a piston rod and an apron surrounding the central piece and axially displaceable thereon; and a first gas generator for producing a propellant gas, wherein both the first chamber and the second chamber are configured to be charged with the propellant gas such that the piston is configured to move through the central region between the first position and the second position.

3. The actuator according to claim 2, wherein the second chamber is configured to be charged with the propellant gas after the charging the first chamber.

4. The actuator according to claim 2, wherein the second chamber is configured to be charged with the propellant gas through the first chamber.

5. The actuator according to claim 2, wherein an inlet passage for propellant gas into the second chamber is blocked when the piston is in a rest position of the piston and is open when the piston is deflected from the rest position.

6. The actuator according to claim 5, wherein the inlet passage is blocked when the piston is in an end position opposite to the rest position.

7. The actuator according to claim 2, wherein the inside width of the cylinder in a central region of the cylinder is greater than in at least one of its end regions.

8. The actuator according to claim 2, wherein the axial displaceability of the apron against the central piece is limited in both directions by stops.

9. The actuator according to claim 2, wherein the apron has the local through openings.

10. The actuator according to claim 2, wherein the spacing of the through openings from one end of the apron is greater than the length of the central region.

11. The actuator according to claim 2, wherein the second chamber communicates with the surroundings by means of a throttle point.

12. A pyrotechnic actuator, comprising:

a cylinder having a first chamber and a second chamber that are separated by a central region and that are both configured to be charged by a propellant gas;

a piston on either side of the cylinder that is configured to be displaced between a first position in the first chamber and a second position in the second chamber, wherein the piston includes openings; and a first gas generator for producing a propellant gas, wherein both the first chamber and the second chamber are configured to be charged with the propellant gas such that the piston is configured to move through the central region between the first position and the second position, and wherein the second chamber is configured to be charged with the propellant gas that passes from the first chamber through the openings.

13. A pyrotechnic actuator, comprising:

a cylinder having a first chamber and a second chamber;

a piston on either side of the cylinder that is configured to be displaced in the cylinder under the influence of the propellant gas, wherein the piston comprises a central piece connected to a piston rod and an apron surrounding the central piece and axially displaceable thereon; and a first gas generator for producing a propellant gas, wherein both the first chamber and the second chamber are configured to be charged with the propellant gas.

14. The actuator according to claim 1, further comprising:

a second gas generator that is configured to be ignited independently of the first gas generator to generate propellant gas after the first gas generator has generated propellant gas.

15. The actuator according to claim 14, wherein the cylinder further comprises a flange with an inlet opening, and further comprising:

a carrier that is fastened to the flange of cylinder and that comprises chambers for holding the first and second gas generators, and wherein each of the first and second gas generators is coupled to the inlet opening to provide propellant gas to the cylinder.

16. The actuator according to claim 14, further comprising:

an electronic ignition circuit that is configured to ignite the first and second gas generators individually and sequentially in response to external ignition commands.

* * * * *